US012759376B2

(12) United States Patent
Rupp

(10) Patent No.: US 12,759,376 B2
(45) Date of Patent: Oct. 13, 2026

(54) LOWER WINDSHIELD ASSEMBLY FOR MANAGING FLUIDS

(71) Applicant: Honda Motor Co., Ltd., Tokyo (JP)

(72) Inventor: Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 523 days.

(21) Appl. No.: 18/230,446

(22) Filed: Aug. 4, 2023

(65) Prior Publication Data

US 2025/0042228 A1 Feb. 6, 2025

(51) Int. Cl.

*B60J 1/00* (2006.01)
*B60J 1/02* (2006.01)
*B60S 1/04* (2006.01)

(52) U.S. Cl.

CPC ................. *B60J 1/008* (2013.01); *B60J 1/02* (2013.01); *B60S 1/0402* (2013.01)

(58) Field of Classification Search

CPC ..... B60R 13/07; B60R 21/213; B60S 1/0463; B60S 1/3488; B60S 1/3493; B62D 25/081; B60J 10/25
USPC ....................................... 296/96.15, 84.1, 12
See application file for complete search history.

(56) References Cited

U.S. PATENT DOCUMENTS 2,922,675 A * 1/1960 Wernig .................... B60J 10/70 49/476.1
3,788,681 A * 1/1974 Barenyi .................... B60S 1/18 15/250.31
5,263,759 A * 11/1993 Brodie .................. B60S 1/0458 15/250.19
8,840,173 B2 * 9/2014 Templeton ............ B60S 1/0447 296/96.17
2013/0076072 A1 * 3/2013 Morden ............... B62D 25/081 296/192
2013/0300154 A1 * 11/2013 Schaefer .............. B62D 25/081 296/192
2015/0151791 A1 * 6/2015 Sano ........................ B60J 10/30 296/192
2017/0355351 A1 12/2017 Cebula et al.
2018/0370490 A1 12/2018 Ford

FOREIGN PATENT DOCUMENTS

| | | | | |
|---|---|---|---|---|
| CN | 108515938 | A | | 9/2018 |
| CN | 109987153 | B | | 7/2019 |
| DE | 102008063112 | A1 | | 9/2009 |
| DE | 102013210943 | A1 | | 12/2014 |
| EP | 2439130 | A1 | | 4/2012 |
| FR | 3059623 | B1 | | 6/2018 |
| FR | 3092071 | A1 | | 7/2020 |
| FR | 3097499 | A1 | | 12/2020 |
| JP | 4848728 | B2 | | 12/2011 |
| JP | 5841987 | B2 | | 1/2016 |
| JP | 2018193066 | A | * | 12/2018 |
| KR | 100535141 | B1 | | 12/2005 |
| WO | 2010130483 | A1 | | 11/2010 |

* cited by examiner

*Primary Examiner* — Patricia L Engle
(74) *Attorney, Agent, or Firm* — Mark E. Duell; Rankin, Hill & Clark LLP

(57) ABSTRACT

A lower windshield assembly for managing fluids from a windshield of a vehicle includes a windshield lower panel for supporting the windshield on the vehicle and a wiper cover disposed over a wiper assembly. The wiper cover includes a shelf portion that extends below the windshield lower panel such that fluid passing over a forward edge of the windshield lower panel is caught by the shelf portion.

19 Claims, 3 Drawing Sheets

LOWER WINDSHIELD ASSEMBLY FOR MANAGING FLUIDS

BACKGROUND

There are many considerations related to fluid management on vehicle windshields. For example, it is important to facilitate removal of various fluids (e.g., rain, windshield washer fluid, etc.) from the windshield without allowing intrusion of the fluids near or around the vehicle's wiper motor(s). Currently, many different approaches are taken to inhibit the flow of these fluids to or near the wiper motors. For example, trough shapes can be provided on the vehicle body or frame panel that supports the windshield, which can be referred to as the windshield lower panel. Also, sealing foams can be deployed between the lower edge of the windshield and the body or frame panel to inhibit fluid flow to or toward the wiper motor(s) and/or can be deployed in relation to the Elkamet seal provided at the lower edge of the windshield. As one example, the Elkamet seal can be the same or similar to that disclosed in U.S. Pat. No. 8,444,205, expressly incorporated herein by reference. Still further, wiper pivot caps can be used and can include unique shapes (e.g., troughs), to catch fluids and inhibit entry toward the wiper motor. Despite usage of the foregoing technologies, there still is a concern that some fluids from the windshield can potentially reach the wiper motors.

BRIEF DESCRIPTION

According to one aspect, a lower windshield assembly for managing fluids from a windshield of a vehicle includes a windshield lower panel for supporting the windshield on the vehicle and a wiper cover disposed over a wiper assembly. The wiper cover includes a shelf portion that extends below the windshield lower panel such that fluid passing over a forward edge of the windshield lower panel is caught by the shelf portion.

According to another aspect, a vehicle windshield assembly for managing fluids includes a lower panel for supporting a lower edge of a vehicle windshield and a wiper cover disposed over a wiper assembly for the vehicle windshield. The cover includes a shelf portion that extends rearwardly toward and underneath a forward edge of the lower panel for catching fluid dripping from the forward edge downward.

According to a further aspect, a wiper cover member for managing fluids from a vehicle windshield includes a shelf portion extending rearwardly below a forward edge of a lower panel that supports a lower edge of the vehicle windshield, a main portion disposed over a wiper assembly for clearing the vehicle windshield and a forward portion having a trough shape for holding and directing fluid caught by the shelf portion.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately" means a reasonable amount of deviation of the modified word is contemplated such that the end result is not significantly changed. As used herein, the term "laterally" shall mean across the vehicle (i.e., in a direction extending from one side of the vehicle toward the other side).

Figure 1:
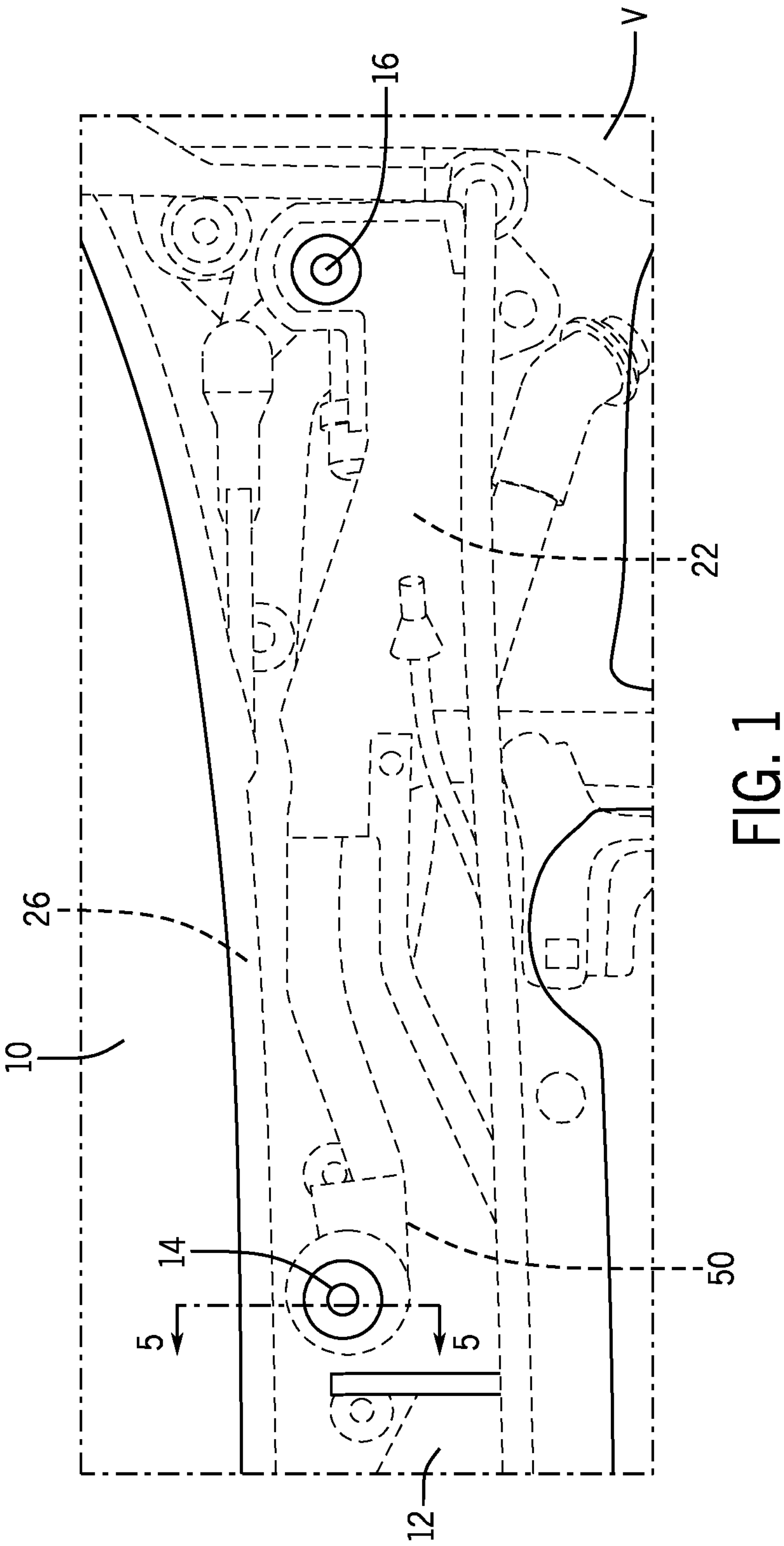
FIG. 1 is a partial schematic view of a lower windshield assembly for managing fluids from a windshield of a vehicle.

Referring now to the drawings, wherein like numerals refer to like parts throughout the several views, FIG. 1 illustrates a vehicle V having a windshield 10 with a lower edge or side **10*a* thereof mating with a cowl member 12. A pair of wiper motor shafts 14, 16 protrude through the cowl member 12 for powering a set of windshield wipers (not shown) on the windshield 10. A first wiper cover 18 is disposed below the cowl member 12 for covering and protecting a wiper assembly 20 (see FIG. 4) of the vehicle V that is associated with the motor shaft 14 and provided for clearing the windshield 10 via the windshield wipers. A second wiper cover 22 is disposed below the cowl member 12 adjacent the first wiper cover 18 for coving and protecting another wiper assembly (not shown) of the vehicle V that is associated with the motor shaft 16 and also provided for clearing the windshield 10** via the windshield wipers.

Figure 2:
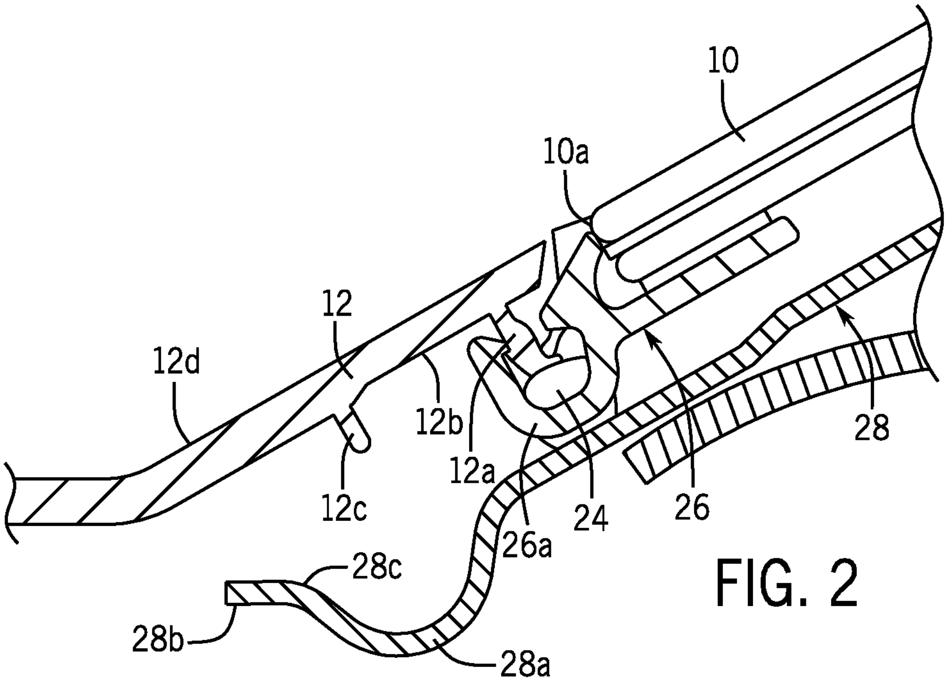
FIG. 2 is a cross-section view showing a portion of the lower windshield assembly including a windshield lower panel having a trough at a lower end thereof for capturing fluid from the windshield.

With additional reference to FIG. 2, the cowl member 12 is secured to the lower edge **10*a* of the windshield 10 by a windshield lower molding 26. The windshield lower molding 26 can be the same or similar to the molding described in U.S. Pat. No. 8,444,205, expressly incorporated herein by reference. The windshield lower molding 26 is supported by a windshield lower panel 28, which can be a panel of the body of the vehicle V, and thus the windshield 10 is supported by the windshield lower panel 28. As shown, the windshield lower panel 28 can include a trough 28*a* formed near a forward edge 28*b* to direct fluid from the windshield 10 laterally toward lateral ends (not shown) of the windshield lower panel 28. The windshield lower panel 28 is interposed between the lower edge 10*a* of the windshield and an upper surface 28*c* of the lower panel 28. As shown, the cowl member 12 is disposed over the windshield lower panel 28**.

The cowl member 12 includes a molding rib **12*a* depending from an underside 12*b* of the cowl member 12 and received within a trough portion 26*a* of the windshield lower molding 26. A sealing foam 24 can also be received in the trough portion 26*a* of the windshield lower molding 26 to engage with the molding rib 12*a* and seal to the cowl member 12. The cowl member 12 additionally includes a drip rib 12***c* disposed forward of the molding rib 12*a* for directing or causing fluid on the underside 12*b* of the cowl member 12 to drip down toward the windshield lower panel 28 and separate from the cowl member 12. As shown, the drip rib 12*c* can be aligned so as to be positioned directly above the trough portion 26*a* such that fluid directed by the drip rib 12*c* falls into the trough portion 26*a*.

Figure 3:
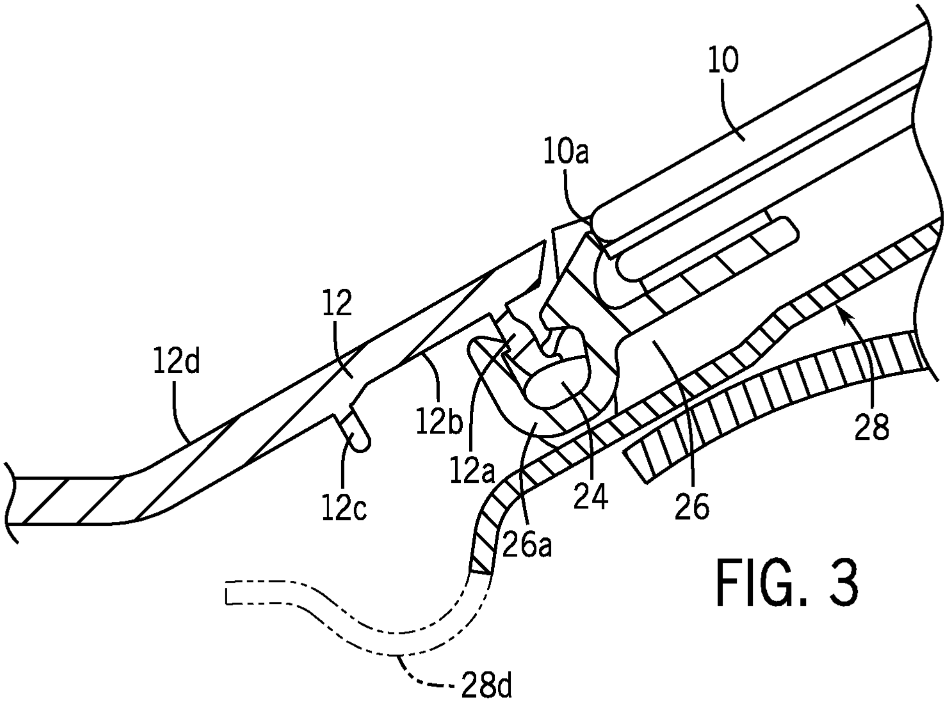
FIG. 3 is a cross-section view that is the same as FIG. 2 but showing a portion of the windshield lower panel trimmed such that the trough is removed.

With additional reference to FIG. 3, a portion 28*d* of the windshield lower panel 28 is removed. In particular, the portion 28*d* is a portion of the trough portion 28*a* of the windshield lower panel 28 and can occur at only a particular lateral location. Such removal can occur via trimming when necessary to facilitate assembly of the vehicle V. For example, such trimming of the windshield lower panel 28 can occur at the location at with the wiper motor shaft 14 is laterally located to facilitate installation and/or assembly of the wipe motor shaft 14 and/or the wiper assembly 20 associated with the wiper motor shaft 14.

Figure 4:
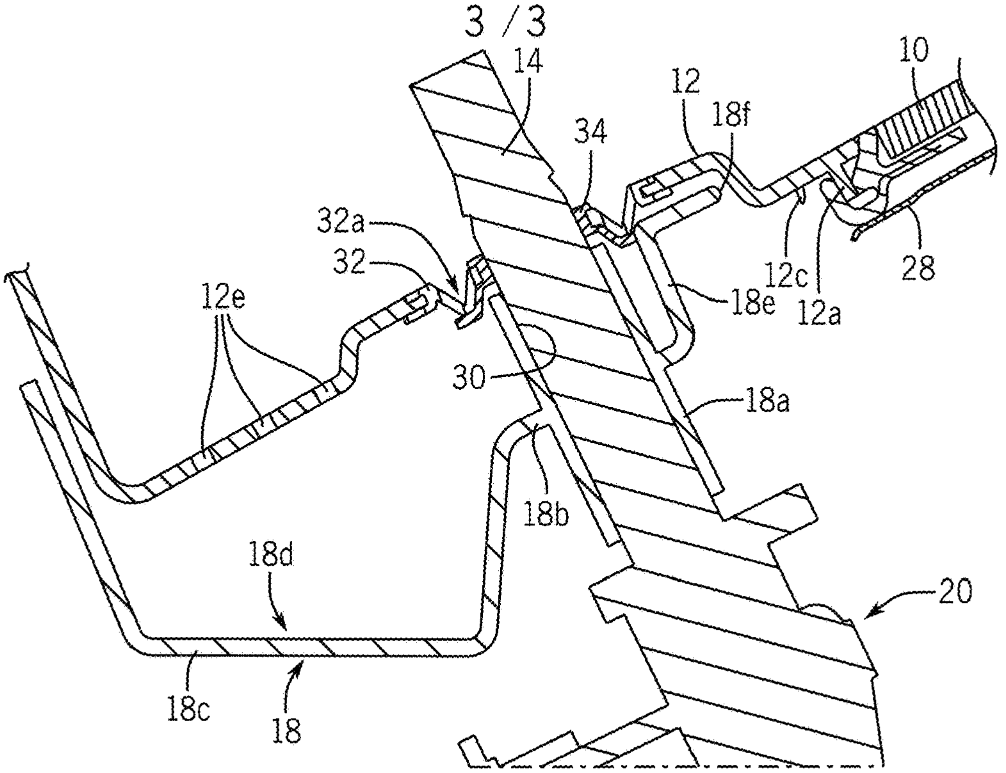
FIG. 4 is a cross section view taken at the location of a wiper motor shaft to show the wiper motor shaft, a wiper cover through which the wiper motor shaft protrudes and a cowl member disposed above the wiper cover with the trough trimmed as shown in FIG. 3.

With further reference to FIG. 4, the wipe motor shaft 14 is shown extending from the wiper assembly 20 and protruding through the cowl member 12. The wiper motor shaft 14 also passes through the wiper cover 18. In particular, the wiper cover 18 can include a shaft portion 18*a* that annularly surrounds the wiper motor shaft 14 and extends along an axial portion of the wiper motor shaft 14. The shaft portion 18*a* can be disposed on a main portion 18*b* of the wiper cover 18 that is itself disposed over the wiper assembly 22 and extends laterally to lateral ends of the wiper cover 18. The shaft portion 18*a* can define a wiper pivot aperture 30 through which the wiper motor shaft 14 of the wiper assembly 20 extends. The wiper cover 18 can also include a forward portion 18*c* having a trough shape 18*d* for holding and directing fluid received on the wiper cover 18 laterally outwardly and a rearward portion 18*e* extending toward the windshield 10 and having a shelf portion 18*f* that supports the underside 12*b* of the cowl member 12.

A pivot cap 32 can be radially interposed between the cowl member 12 and the wiper motor shaft 14 of the wiper assembly 20. The pivot cap 32 can include a circumferential groove 32*a* defines therein for capturing fluids received from an upper side 12*d* of the cowl member 12 and inhibiting such fluids from passing toward the wiper assembly 20. An annular bearing 34 can be radially interposed between the pivot cap 32 and the cowl member 12. As shown, the cowl member 12 can include passages 12*e* defined therethrough for directing fluid received on the cowl member 12, such as from the windshield or directly on the cowl member 12 (e.g., rain), through the cowl member 12 and into the trough shape 18*d* of the wiper cover 18.

Figure 5:
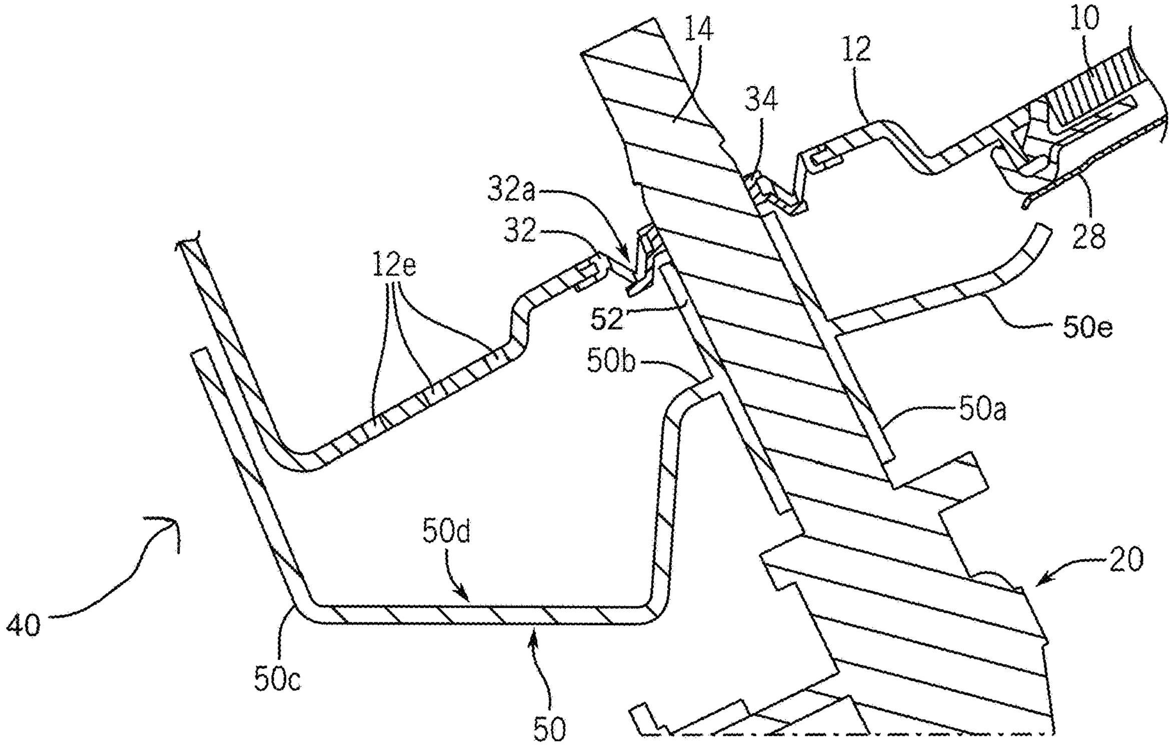
FIG. 5 is a cross-section view taken along the line 5-5 of FIG. 1 and is the same as the cross-section view of FIG. 4 but showing a wiper cover having shelf portion that extends below the windshield lower panel such that fluid passing over a forward edge of the windshield lower panel is caught by the shelf portion according to an exemplary embodiment.

With reference to FIG. 5, a lower windshield assembly 40 is illustrated according to an exemplary embodiment for managing fluids from the windshield 10 of the vehicle V. The lower windshield assembly 40 can include many of the same elements as shown and described in relation to FIGS. 1-4. In particular, the lower windshield assembly 40 can include the windshield lower panel 28 for supporting the windshield 10 on the vehicle V but includes wiper cover 50 instead of the wiper cover 18 disposed over the wiper assembly 20. Except as indicated hereinbelow, the wiper cover 50 can be the same or similar to the wiper cover 18.

Like the wiper cover 18, the wiper cover 50 includes a wiper pivot aperture 52 through which the wiper motor shaft 14 of the wiper assembly 20 extends. More specifically, the wiper cover 50 can include a shaft portion 50*a* that annularly surrounds the wiper motor shaft 14 and extends along an axial portion of the wiper motor shaft 14. The shaft portion 50*a* can be disposed on a main portion 50*b* of the wiper cover 50 that is itself disposed over the wiper assembly 20 and extends laterally to lateral ends of the wiper cover 50. The wiper cover 50 can also include a forward portion 50*c* having a trough shape 50*d* for holding and directing fluid received on the wiper cover 50 laterally outwardly.

Instead of the shelf portion 18*f*, the wiper cover 50 includes a shelf portion 50*e* that extends below the windshield lower panel 28 such that fluid passing over the forward edge 28*b* of the windshield lower panel 28 is caught by the shelf portion 50*e*. In particular, the shelf portion 50*e* can extend below the windshield lower panel 28, and specifically below and past the forward edge 28*b* of the windshield lower panel 28, and this shelf portion 50*e* is disposed laterally at least at the location of the wiper assembly 20. Accordingly, the shelf portion 50*e* can extend rearwardly toward and underneath the forward edge 28*b* of the lower panel 28 for catching fluid dripping from the forward edge 28*b* downward. In the illustrated embodiment, the shelf portion 50*e* can form or be disposed along a rear edge of the wiper cover 50.

Optionally, though not required, the shelf portion 50*e* can extend laterally along an entire extent of the windshield lower panel 28. In alternate embodiments, the shelf portion 50*e* can extend laterally to spaced apart locations relative to the wiper assembly 20 but less than an entire lateral extent of the windshield lower panel 28. For example, the shelf portion 50*e* can extend laterally a substantial portion (e.g., more than 50%) of a lateral extend of the wiper cover 50. Advantageously, the trough 28*a* is removed (i.e., see removed portion 28*d* in FIG. 3) at least at the location at which the shelf portion 50*e* extends below the windshield lower panel 28, thus the shelf portion 50*e* catches fluids passing over the lower panel 28.

The lower windshield assembly 40 can also include the windshield lower molding 26 and the cowl member 12. In association with the cowl member, the lower windshield assembly 40 can include the pivot cap 32 and the annular bearing 34. The wiper assembly 20 and the wiper motor shaft can both be disposed laterally in alignment with a location at which the shelf portion 50*e* of the wiper cover 50 extends below the windshield lower panel 28.

In use, the shelf portion 50*e* functions to catch fluids passing over the windshield lower panel 28. In particular, the shelf portion 50*e* can catch fluids that pass over the windshield lower panel 28 at a lateral location or locations where the trough 28 of the lower panel 28 has been removed. This advantageously inhibits fluid from passing toward the wiper assembly 20.

It will be appreciated that various of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A lower windshield assembly for managing fluids from a windshield of a vehicle, comprising:

a windshield lower panel for supporting the windshield on the vehicle, wherein the windshield lower panel includes a trough portion to direct fluid from the windshield laterally toward lateral ends of the windshield lower panel; and a wiper cover disposed over a wiper assembly, the wiper cover including a shelf portion that extends below the windshield lower panel such that fluid passing over a forward edge of the windshield lower panel is caught by the shelf portion.

2. The lower windshield assembly of claim 1 wherein the wiper cover includes a wiper pivot aperture through which a wiper motor shaft of the wiper assembly extends and wherein the shelf portion that extends below the windshield lower panel is disposed laterally at least at a location of the wiper assembly.

3. The lower windshield assembly of claim 2 wherein the shelf portion extends laterally along an entire extent of the windshield lower panel.

4. The lower windshield assembly of claim 1 wherein the trough portion is removed at least at a location at which the shelf portion extends below the windshield lower panel.

5. The lower windshield assembly of claim 1 further including a windshield lower molding interposed between a lower edge of the windshield and an upper surface of the windshield lower panel.

6. The lower windshield assembly of claim 5 further including a cowl member secured to the lower edge of the windshield by the windshield lower molding, the cowl member disposed over the windshield lower panel.

7. The lower windshield assembly of claim 6 wherein the cowl member includes a molding rib depending from an underside of the cowl member and received within a trough portion of the windshield lower molding.

8. The lower windshield assembly of claim 7 further includes a sealing foam received in the trough portion of the windshield lower molding to engage with the molding rib and seal to the cowl member.

9. The lower windshield assembly of claim 7 wherein the cowl member further including a drip rib disposed forward of the molding rib for directing fluid on the underside of the cowl member to drip down toward the windshield lower panel.

10. The lower windshield assembly of claim 6 further including a pivot cap radially interposed between the cowl member and a wiper motor shaft of the wiper assembly disposed laterally in alignment with a location at which the shelf portion of the wiper cover extends below the windshield lower panel.

11. The lower windshield assembly of claim 10 wherein the pivot cap includes a circumferential groove for capturing fluids received from an upper side of the cowl member and inhibiting said fluids from passing toward the wiper assembly.

12. A vehicle windshield assembly for managing fluids, comprising:

a lower panel for supporting a lower edge of a vehicle windshield, wherein the lower panel includes a trough portion to direct fluid from the windshield laterally toward lateral ends of the lower panel; and a wiper cover disposed over a wiper assembly for the vehicle windshield, the cover including a shelf portion that extends rearwardly toward and underneath a forward edge of the lower panel for catching fluid dripping from the forward edge downward.

13. The vehicle windshield assembly of claim 12 further including:

a cowl member extending from the lower edge of the vehicle windshield and disposed over the lower panel and the wiper cover.

14. The vehicle windshield assembly of claim 13 wherein the cowl member including a wiper pivot aperture through which a wiper motor shaft of the wiper assembly extends, wherein the shelf portion is disposed laterally at least at a lateral location of the wiper pivot aperture.

15. The vehicle windshield assembly of claim 14 wherein the shelf portion extends laterally a substantial portion of a lateral extent of the wiper cover.

16. The vehicle windshield assembly of claim 13 wherein the cowl member includes at least one rib depending from an underside of the cowl member to cause fluid on the underside of the cowl member to drip downward and separate from the cowl member.

17. The vehicle windshield assembly of claim 12 wherein the wiper cover includes the shelf portion disposed along a rear edge of the wiper cover.

18. The vehicle windshield assembly of claim 17 wherein the wiper cover includes a trough shape disposed along a forward edge of the wiper cover.

19. A wiper cover member for managing fluids from a vehicle windshield, comprising:

a shelf portion extending rearwardly below a forward edge of a lower panel that supports a lower edge of the vehicle windshield, wherein the lower panel includes a trough portion with a removed section at least at a location of a wiper assembly;

a main portion disposed over a wiper assembly for clearing the vehicle windshield; and a forward portion having a trough shape for holding and directing fluid caught by the shelf portion.

* * * * *